Sept. 22, 1970 J. MATARESE 3,530,238

DIGITAL SYNCHRONIZING SYSTEM FOR TELEVISION RECEIVERS

Filed Dec. 4, 1967 7 Sheets-Sheet 1

INVENTOR.
JOHN MATARESE

BY Joseph H. Roediger
ATTORNEY.

Sept. 22, 1970 J. MATARESE 3,530,238

DIGITAL SYNCHRONIZING SYSTEM FOR TELEVISION RECEIVERS

Filed Dec. 4, 1967 7 Sheets-Sheet 2

INVENTOR.
JOHN MATARESE
BY Joseph H. Roediger
ATTORNEY.

INVENTOR.
JOHN MATARESE
BY Joseph H. Roediger
ATTORNEY.

Sept. 22, 1970 J. MATARESE 3,530,238
DIGITAL SYNCHRONIZING SYSTEM FOR TELEVISION RECEIVERS
Filed Dec. 4, 1967 7 Sheets-Sheet 4

INVENTOR.
JOHN MATARESE
BY Joseph H. Roediger
ATTORNEY.

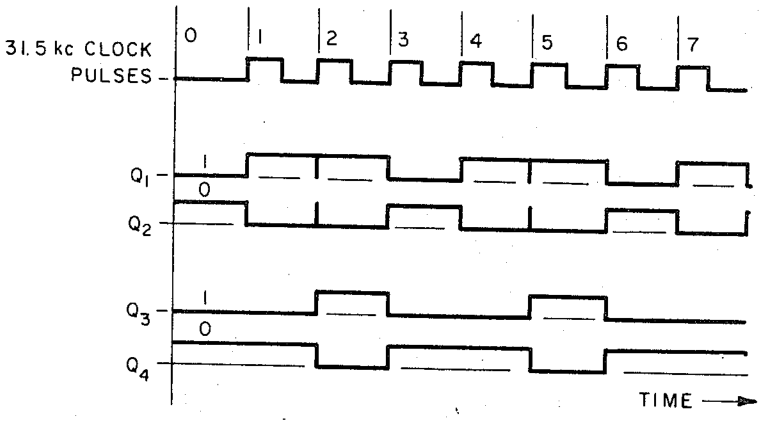
Fig. 5a.
| INTERVAL | AND |
|---|---|
| 1 | $Q_2, Q_3$ |
Fig. 5b.
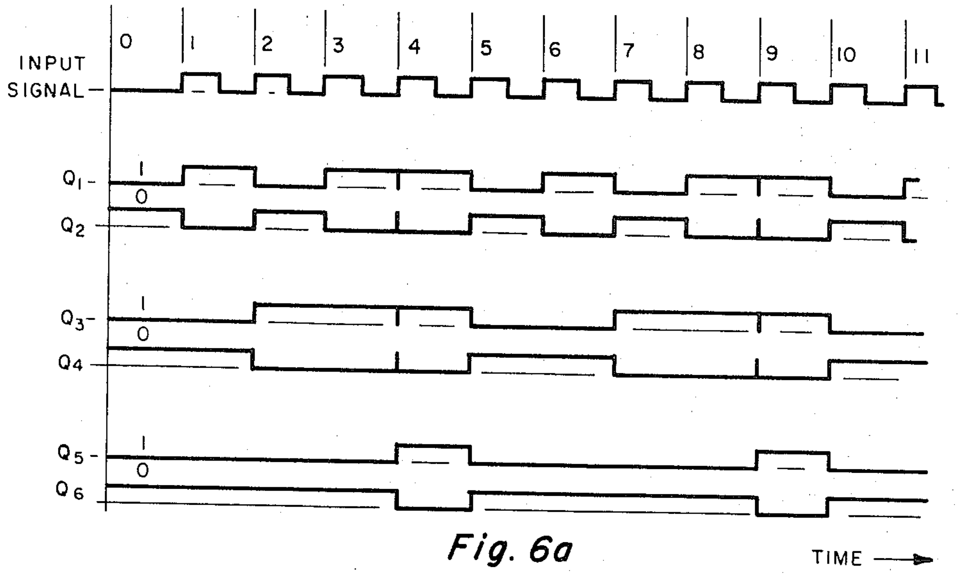
Fig. 6a
| INTERVAL | AND |
|---|---|
| 1 | $Q_2, Q_3$ |
Fig. 6b.
INVENTOR.
JOHN MATARESE
BY Joseph H. Roediger
ATTORNEY.

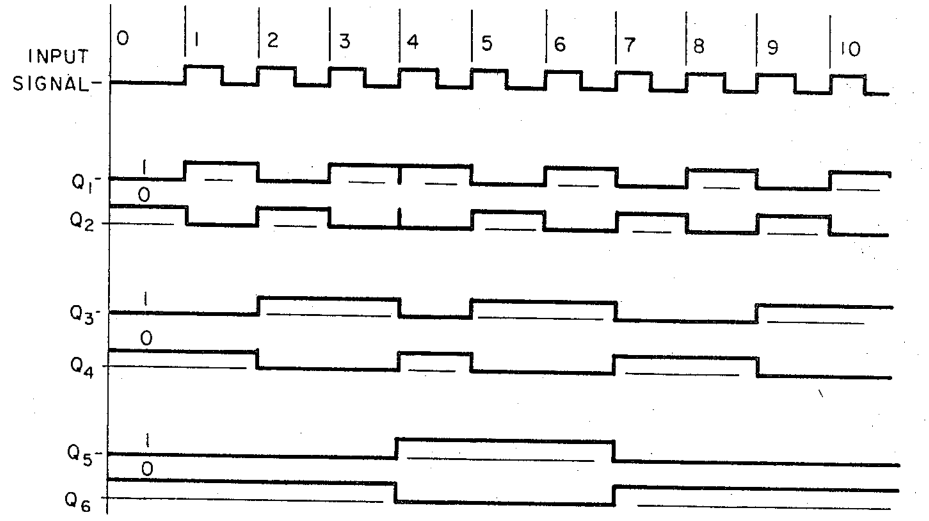
Fig. 7a.
| INTERVAL | AND |
|---|---|
| 1 | $Q_2, Q_3, Q_5$ |
Fig. 7b.
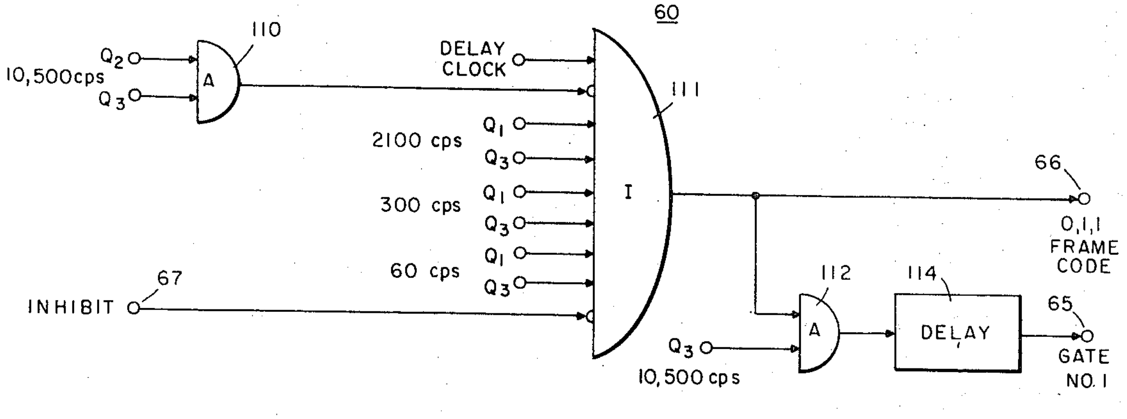
Fig. 8.
INVENTOR.
JOHN MATARESE
BY Joseph H. Roediger
ATTORNEY INVENTOR.
JOHN MATARESE
BY Joseph H. Roediger
ATTORNEY.

United States Patent Office 3,530,238
Patented Sept. 22, 1970

3,530,238
DIGITAL SYNCHRONIZING SYSTEM FOR TELEVISION RECEIVERS

John Matarese, New City, N.Y., assignor to General Telephone & Electronics Laboratories Incorporated, a corporation of Delaware Filed Dec. 4, 1967, Ser. No. 687,573
Int. Cl. H04n 5/04
U.S. Cl. 178—7.3 16 Claims

ABSTRACT OF THE DISCLOSURE

A synchronizing system for television receivers is described wherein digital logic sync separation techniques are employed to extract the horizontal and vertical frequency and phase information from a locally generated binary equivalent of the conventional composite sync signal. A local oscillator establishes the basic system frequency or bit rate, and division of the local oscillator signal is utilized to generate the 60 c.p.s. vertical sync signal. A local framing code is generated during each field and compared in a binary comparator with the binary composite sync signal. If coincidence does not exist between the local framing code and the framing code of the binary signal, an error signal is generated which inhibits the operation of the dividers until synchronism is obtained. The horizontal sync signal is generated by division of the local oscillator signal and is compared with a reference phase signal to insure synchronism.

BACKGROUND OF THE INVENTION

This invention relates to a digital synchronizing system for television receivers.

To coordinate the scanning processes of television transmitters and receivers, three forms of synchronizing signals are used: vertical sync signals, equalizing sync signals, and horizontal sync signals. These signals are known collectively as the deflection sync signals since they are employed to initiate the vertical and horizontal retrace motions in scanning deflection. The deflection sync signals are common to both color and monochrome transmission and occupy the portion of the modulation envelope of the RMA composite video signal adjacent to the blanking level. As a result, these signals are readily separable from the picture information region of the video signal.

In a television receiver, the horizontal sync pulses initiate the retrace of the electron beam at the end of each scanning line, and consequently occur at the horizontal scanning rate. To insure that there is essentially no interruption in the horizontal synchronizing action, the horizontal sync pulses are provided during the vertical blanking periods. The vertical sync pulses are made distinguishable from the horizontal sync pulses on the basis of their waveforms. In practice, the vertical pulses are substantially longer than the horizontal pulses but contain serrations to insure continuity of the horizontal synchronization. Since the composite sync signal contains pulses of different durations, it is essentially a width-modulated pulse train.

During the operation of a typical television receiver, the vertical sync pulses are utilized to charge a large capacitor, and to insure equal integration on successive vertical sync signals it is important that each vertical pulse have essentially the same shape as those preceding and following it. This requirement is complicated by the fact that the display area is scanned in an interlaced manner with each field scan containing a whole number of line scans, plus one-half a line. The effect of this half-line on the vertical pulse shape is reduced by arranging the serrations so that they occur at a spacing one-half as large as the intervals between horizontal sync pulses. In addition, the energy in successive vertical pulses is equalized by the use of equalizing pulses occurring at a spacing equal to that of the serrations for periods preceding and succeeding the vertical sync pulse.

The scanning circuits of a conventional television receiver comprise two independent systems, the horizontal and the vertical. Each system employs an oscillatory timing generator controlled by the synchronizing information contained in the composite video signal and followed by a drive-waveform shaping circuit. The drive-waveform controls the power amplifiers of the receiver to provide the appropriate current for picture-tube beam deflection. To correct for variations in the frequency of the scanning signals, the receiver is provided with scanning synchronizing controls which adjust the time constants of the oscillatory timing generators. These controls are generally referred to as the vertical and horizontal hold controls and enable the viewer to correct for a lack of synchronism between the receiver's horizontal and vertical scanning generator.

The present invention is directed to the provision of an automatic synchronizing system in a television receiver which extracts the horizontal and vertical frequency and phase information from the composite sync signal and both detects and corrects for a lack of synchronization between the local and received signals. This system permits the receiver to be immune from the misadjustment of local horizontal and vertical frequency controls. Consequently, a television receiver utilizing the present system need not contain the external horizontal and vertical hold controls heretofore required since "hands-off" reception of television transmissions is provided. While the automatic synchronizing system employs a large number of electrical components therein, the development of advanced integrated circuit fabrication techniques enables complex systems to be made relatively inexpensively in compact units for inclusion in television receivers.

SUMMARY OF THE INVENTION

The present invention relates to a digital synchronizing system for television receivers which is compatible with existing transmission standards.

The digital system converts the standard composite sync signal, comprising a width modulated pulse train, into a binary equivalent composite sync signal which retains the frequency and phase information present in the composite sync signal. The binary sync signal comprises a train of pulses of constant width occurring at a bit rate which is equivalent to twice the horizontal scan frequency. The horizontal sync pulses appear as "ones" alternating with "zeros" while the equalizing and vertical sync pulses appear as groupings of consecutive "zeros" and "ones" respectively. The sync separation techniques employed by the present system to extract the horizontal and vertical information from the composite signal are digital. Consequently, the system can be fabricated by presently available integrated circuit fabrication techniques.

The system includes a binary sync signal generator for receiving a standard composite sync signal and generating a binary equivalent thereof. The output of the binary sync signal generator is supplied to a first shift register which continually records a predetermined number of bits or digits of the composite binary sync signal.

The bits contained in the first register follow a 1, 0, 1, 0 . . . sequence corresponding to the horizontal sync pulses of the binary train which appear as "ones" alternating with "zeros" until the time at which the equalizing pulses occur. At this time, the bits appear as a succession of "zeros," generally six, followed by a succession of "ones" which correspond to the vetical sync pulses of the standard composite sync signal. Thus, the transition from a plurality of "zero" bits to a "one" bit occurs only once each field during the line scan intervals. The three bit framing code (0, 1, 1) occurs every field during the 523rd, 524th, and 525th line intervals and appears in the first shift register at that time.

Further, means are provided for generating a local sync signal at the desired frequency. The local generating means includes a chain of synchronous dividers. The dividers are supplied with a square wave signal having a bit rate of 31.5 kcs. or twice the equivalent of the 15.75 kcs. horizontal scan frequency. In practice, this signal is generated by a 31.5 kcs. clock oscillator which is automatically phase controlled (APC) to the leading edge of the pulses comprising the standard composite sync signal and is used to establish the basic system frequency or bit rate. Since the system frequency is established at 31.5 kcs., the dividers have a total division ratio of 525 to provide the standard 60 c.p.s. vertical sync signal.

Each divider in the chain is synchronous so that the individual dividers can be inhibited and started again in synchronism. When not inhibited, the division of the 31.5 kcs. clock signal results in a 60 c.p.s. local sync pulse train. In addition, the local generating means includes a frame code generator coupled to the outputs of the individual dividers. The frame code generator produces the (0, 1, 1) three bit framing code each field at a prescribed time relative to the local sync pulse train. For example, the framing code may be generated during the intervals corresponding to the 523rd, 524th, and 525th output pulses from the clock oscillator. To effect frame synchronization, wherein a frame comprises two successive fields or one complete scan of the picture area, the output of the local generating means is supplied to and stored in a second shift register. The second shift register converts the framing code (0, 1, 1) to its corresponding space sequence of bits.

The contents of the first and second shift registers are supplied to a gated binary comparator. The comparator compares the contents of the shift registers at a predetermined time when the (0, 1, 1) code is normally contained in one of the registers. If coincidence does not exist between the storage of the local framing code and the framing code of the binary equivalent signal in the registers, an error signal is generated by the comparator. Thus, the error signal is generated by the gated comparator when frame coincidence is not present, i.e. (0, 1, 1) signals are not simultaneously stored in the first and second shift registers. When generated, this error pulse sets an inhibit flip-flop which inhibits further operation of the local generating means and places the individual dividers in thier zero or initial states. During the period in which the local generating means is inhibited, the generation of the 60 c.p.s. vertical sync pulses is halted.

As mentioned, the received (0, 1, 1) framing code is recorded in the first shift register at the time of the transition between the equalizing and vertical sync pulses of the binary composite signal. In addition to being supplied to the gated binary comparator, the output of the first register is supplied to an initiating means which overrides the inhibiting of the local generating means at a prescribed time. The initiating means includes a comparator having the framing code (0, 1, 1) preset therein. This comparator generates an output pulse when the received framing code is in agreement with the preset code. The signal from the preset comparator is supplied to the inhibit flip-flop and resets it to override the inhibiting of the operation of the local generating means. Thus when the out of phase condition is recognized by the gated comparator, the preset comparator operates to correct the phase of the locally generated 60 c.p.s. vertical sync signal. While the vertical scan is inhibited for the period of time required to effect synchronization between the received framing code and the locally generated framing code, the period is of the order of milliseconds and therefore is not apparent to the viewer.

The local 15.75 kcs. horizontal synchronizing signal is provided by coupling the output of the 31.5 kcs. APC clock generator to a divider. To insure a proper phase relationship between the local horizontal sync signal and the received signal, the composite sync signal is phase compared with a 15.75 reference phase signal derived from the composite sync signal. The out of phase condition primarily arises in the generation of the local horizontal sync signal due to the fact that the 31.5 kcs. signal is divided by two and phase ambiguity exists. To obtain synchronization, a correction pulse is generated when the signals are out of phase. If uncorrected, the phase reversal of the horizontal sync signal appears as a physical displacement of the TV picture in which the horizontal blanking interval occupies a vertical strip along the picture center.

In summary, the present digital synchronizing system operates to initially force itself into frame synchronization by inhibiting the generation of the local vertical signal until a sync condition is obtained and then continually comparing to see if the framing codes coincide. Once loss of vertical sync is established, the system corrects itself within the following field interval by its direct control of the vertical divider. The horizontal sync signal is derived from the system oscillator by division and is continually phase compared with a reference phase signal. If a phase error is existent, the horizontal signal undergoes phase reversal to restore the proper phase relationship between the locally generated horizontal sync signal and the received sync signal.

Further features and advantages of the invention will become more readily apparent from the following detailed description of a specific embodiment taken in conjunction with the accompanying drawings.

FIGS. *5a, 5b, 6a, 6b, 7a* and *7b* are diagrams illustrating the operation of the divider chain 50.

Figure 1:
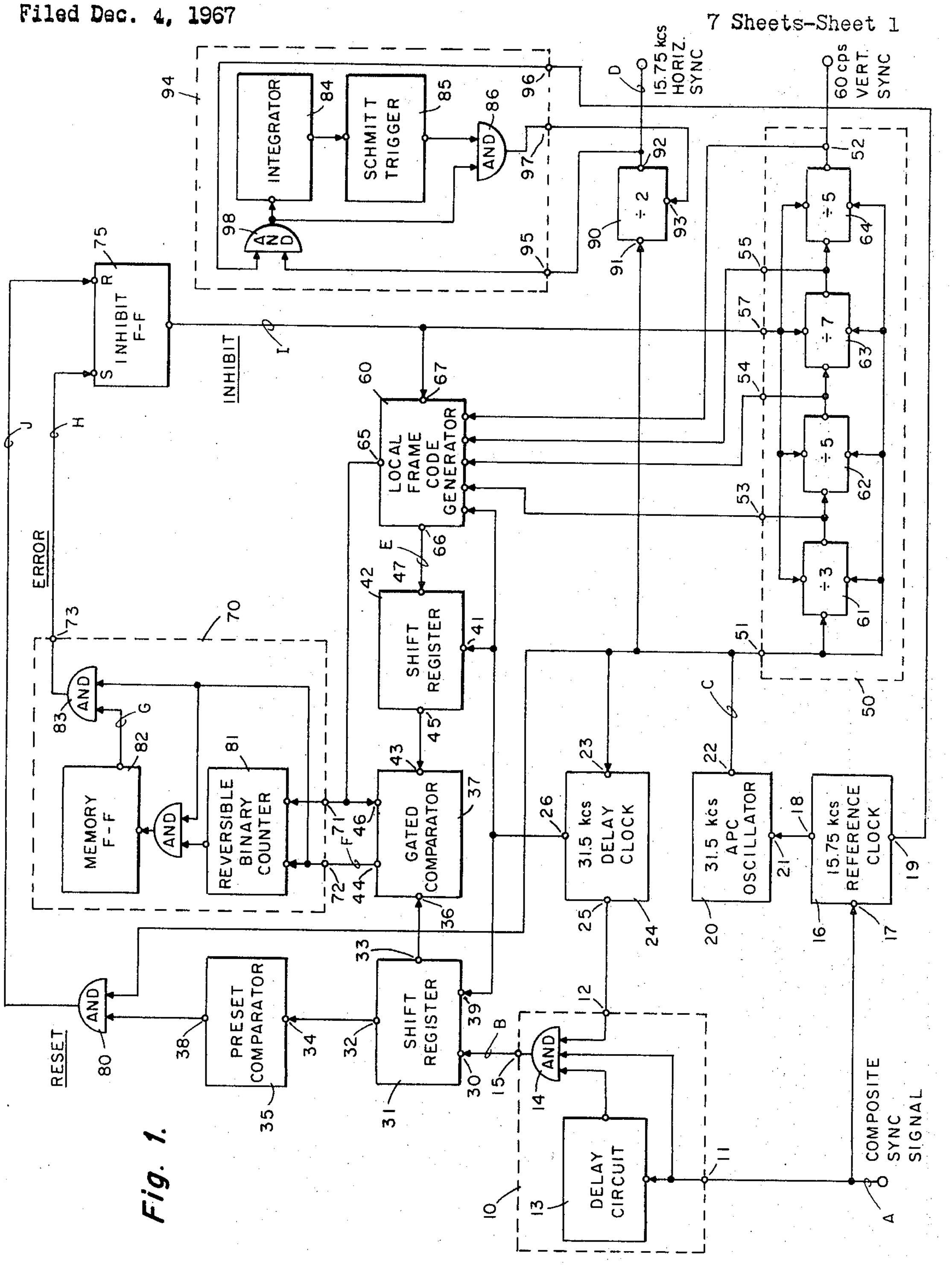
FIG. 1 shows a block schematic diagram of one embodiment of the invention.
Figure 9:
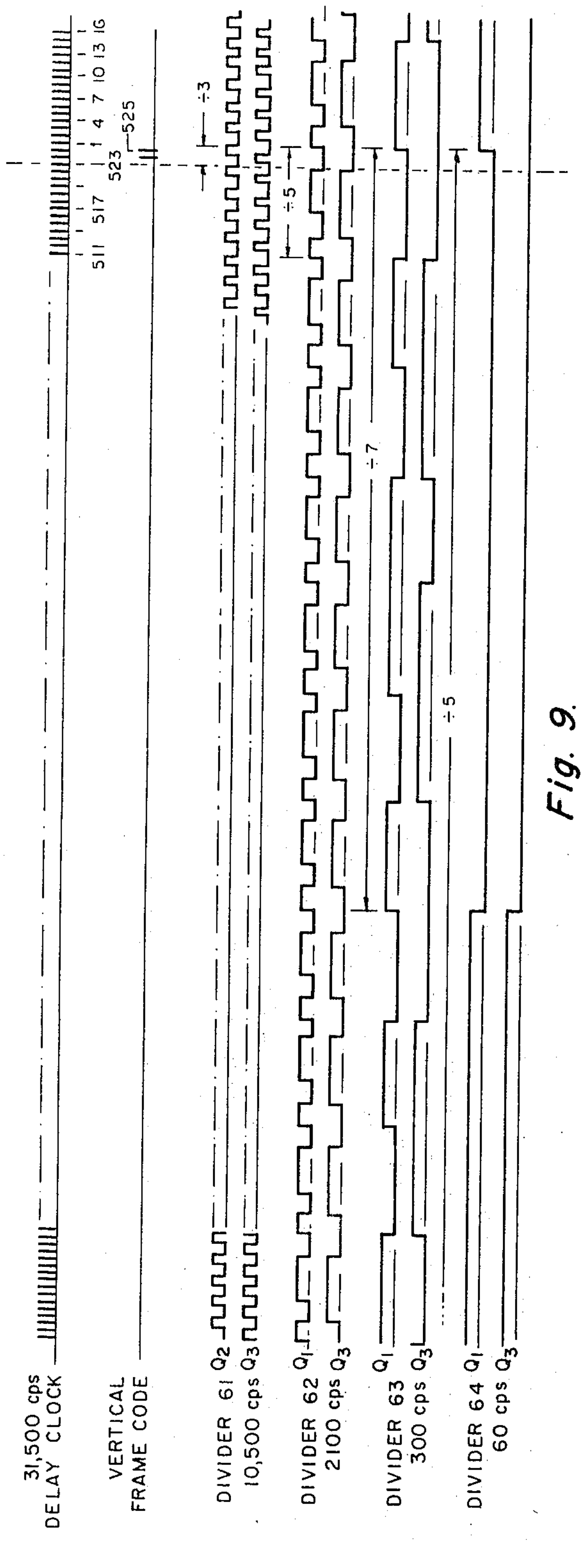

FIGS. 8 and 9 are the block and timing diagrams for the frame code generator 60 of the embodiment of FIG. 1.

Figures 10, 11:
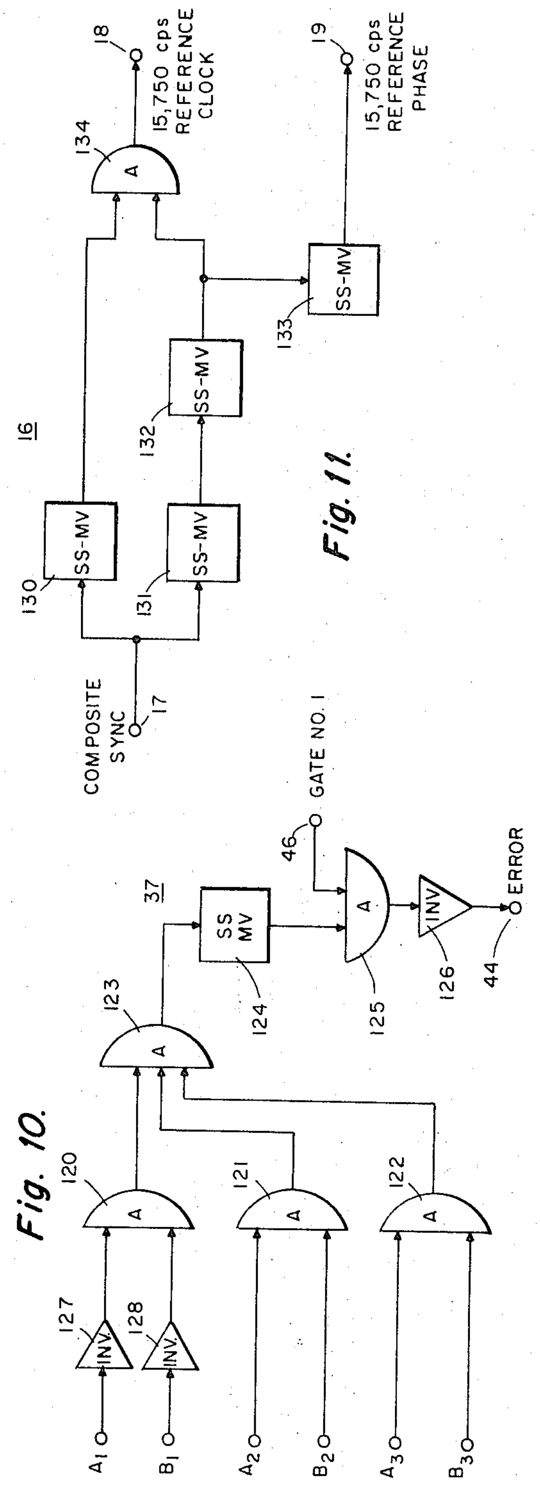

FIG. 10 is a block diagram of the gated binary comparator 37 of the embodiment of FIG. 1.

FIG. 11 is a block diagram of the reference clock generator 16 of the embodiment of FIG. 1.

DESCRIPTION OF THE PREFERRED EMBODIMENT

Referring to FIG. 1, a digital synchronizing system for television receivers is set forth in block diagrammatic form. The system is automatic in that it can reestablish synchronism in an interval which normally does not exceed the period required for one field scan (16.67 milliseconds). Consequently, a television receiver employing the present system does not require the external horizontal and vertical hold controls presently employed, and thus the receiver is immune to local misadjustment.

Figure 2:
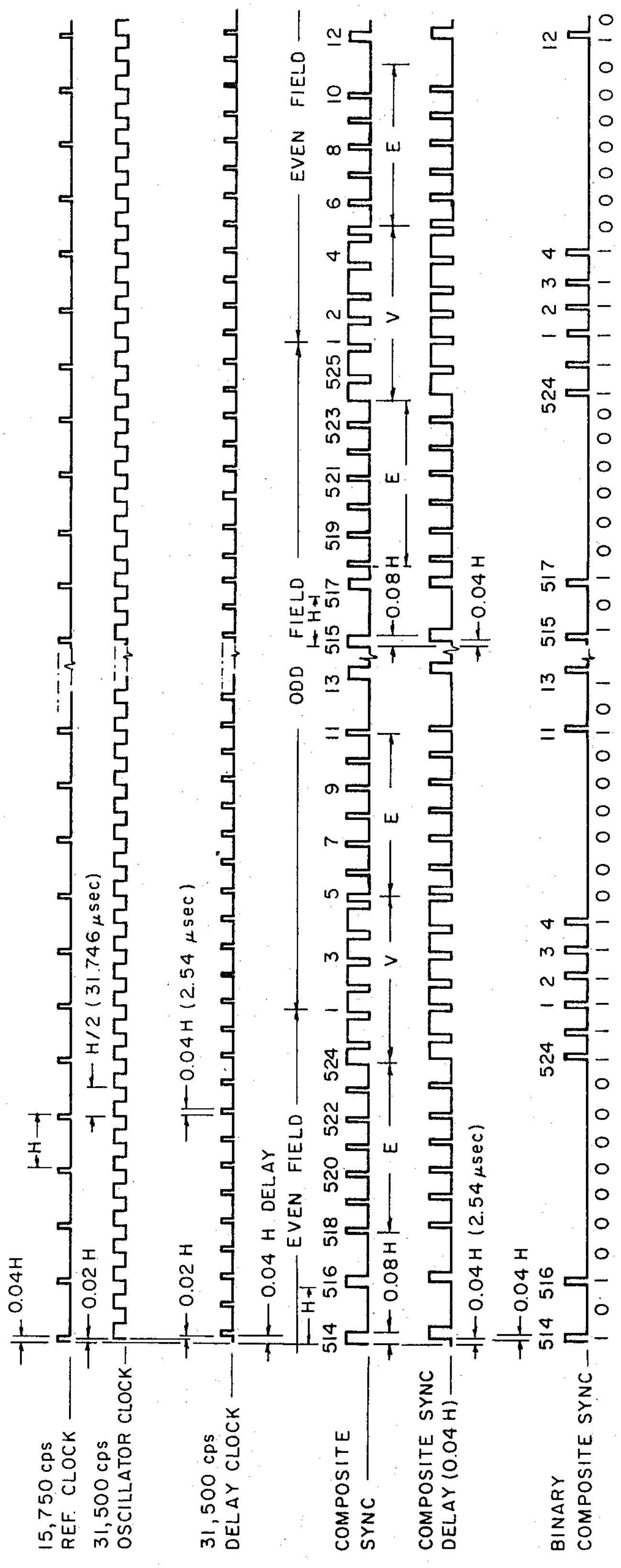
FIG. 2 is a timing diagram for the sync signal generator 10 of FIG. 1.
Figure 3:
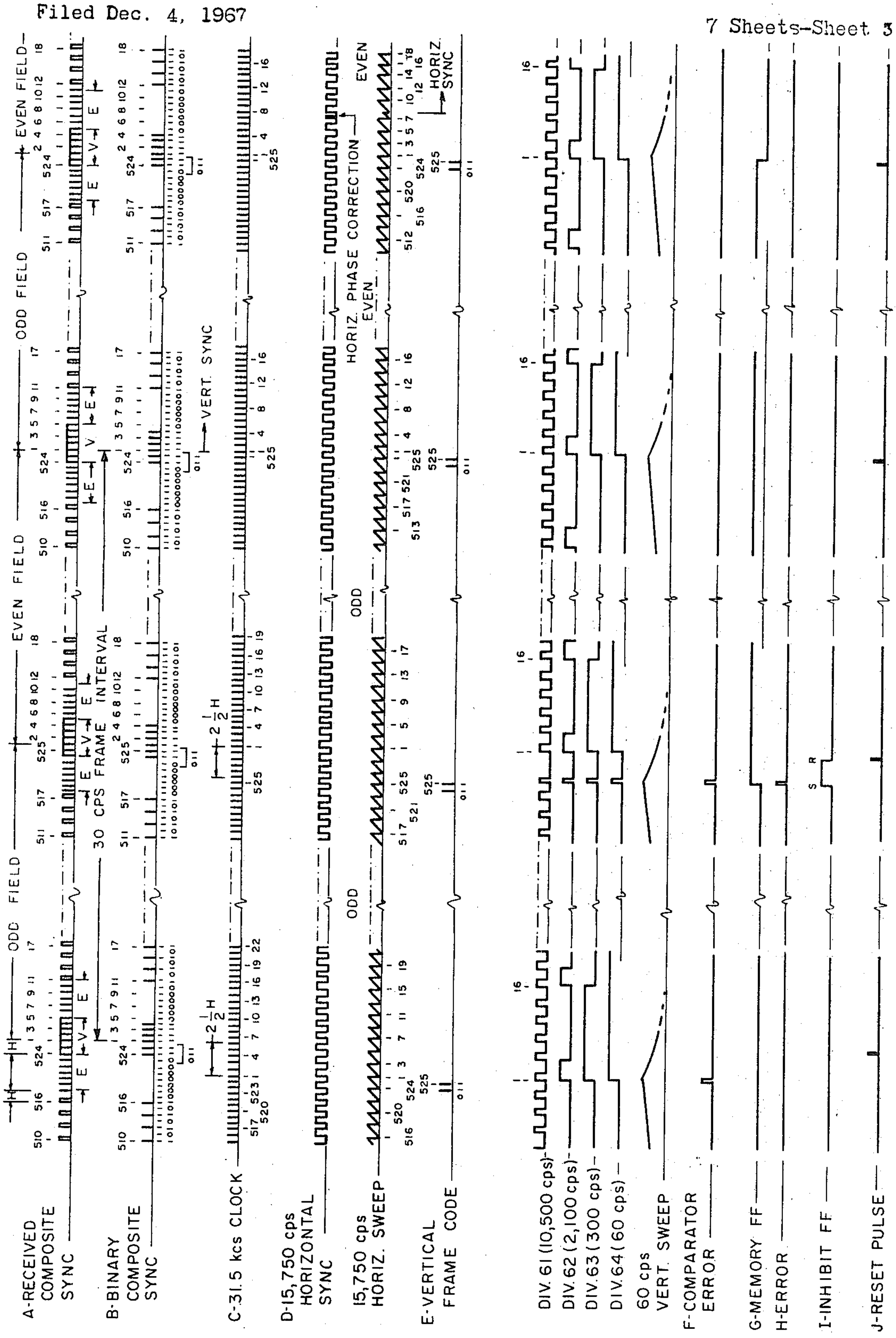
FIG. 3 is a timing diagram for the embodiment of FIG. 1.

The system is compatible with existing television transmission standards and operates with the standard composite sync signal, derived from the RMA composite video signal, as its input signal. The composite sync signal, portions of which are shown in the timing diagrams of FIGS. 2 and 3, is comprised of a train of horizontal, vertical and equalizing synchronizing pulses of specified widths. The horizontal pulses occur at a rate of 15.75 kcs. for monochrome signals and have a constant width of .08H where H is 63.5 microseconds, the period between the leading edges of successive horizontal pulses. The vertical pulses (V) occur at a rate of 60 c.p.s. and have a width of 3H with a period between the leading edges of successive vertical pulses equal to 16.67 milliseconds. The horizontal sync phase information is retained in the vertical sync pulses by a series of serrations. In addition, the equalizing pulses, shown during the interval E, have a width of .04H and are transmitted on either side of the vertical sync pulses. The waveforms of FIGS. 2 and 3 are shown with respect to a single reference or baseline voltage level.

The present system converts the standard width modulated composite sync signal into a "one-zero" binary equivalent which retains the necessary frequency and phase information. In the embodiment of FIG. 1, the conversion from the standard composite sync signal takes place in binary sync signal generator 10 which comprises first and second input terminals 11, 12 respectively, delay circuit 13, coincidence gate, i.e., "and" circuit 14, and output terminal 15. The composite sync signal is supplied to input terminal 11 of generator 10 and to input terminal 17 of reference clock generator 16.

The clock generator 16 provides a pulse train at a rate of 15.75 kcs. at its first output terminal 18. The individual pulses are of .04H duration (2.54 μsec.) and are in phase with the leading edge of the horizontal pulses in the received composite signal. A more detailed description of reference clock generator 16 is contained in a later portion of the specification. The output terminal 18 is coupled to input terminal 21 of 31.5 kcs. APC oscillator 20. Oscillator 20 is automatically phase controlled to the leading edge of the 15.75 kcs. reference clock to establish the oscillator phase with respect to the received composite signal. The APC control of this oscillator maintains the high degree of phase stability required by digital circuitry. However, the 31.5 kcs. signal may, in practice, be derived from the receiver clock in a completely digital color television receiver. In this type of receiver, a single receiver clock is automatically phase controlled to the 3.58 mcs. color subcarrier signal rather than the 15.75 kcs. signal. In the present embodiment, the oscillator 20 establishes the basic sync system bit rate. One type of oscillator suitable for use in the embodiment of FIG. 1 is an integratable RC Wein Bridge circuit incorporating a field effect transistor as a variable resistance phase controlling element. The phase control is provided by a balanced diode phase detector which generated a DC signal having a polarity and magnitude which is a function of the direction and magnitude of the relative phase difference between oscillator signal and the pulse train from reference clock 16.

Although the present description refers to a digital sync system having a 31.5 kc. basic system frequency for a monochrome receiver, it will be noted that the oscillator 20 is automatically phase locked to the received signal and, thus, its frequency is automatically adjusted to 31,468.52 c.p.s. for color signal reception.

The oscillator 20 includes a squaring circuit so that the signal appearing at the oscillator output termnial 22 is a square-wave having a repetition rate of 31.5 kc. The oscillator output terminal 22 is coupled to input terminal 23 of delay clock generator 24. Delay clock generator 24 does not alter the frequency of the pulse train from oscillator 20 and the signals appearing at its output terminal 25 occur at the 31.5 kc. system rate. However, clock generator 24 provides a train of output pulses wherein the individual pulses have a duration of .04H and are delayed by .04H relative to the leading edge of the horizontal sync pulses in the received composite signal. In accordance with television standards, the period H is equal to 63.5 μsec. so that .04H is then equal to 2.54 μsec. Also, the pulse width of the horizontal sync pulses in the received composite sync signal is standardized at .08H. Consequently, the clock pulses at terminal 25 occur during the last half of the received horizontal sync pulses.

The waveforms of the signals utilized in generating the composite binary sync signal are shown in FIG. 2. The 15.75 kc. pulse train appearing at the output terminal 18 of reference clock generator 16 is comprised of pulses having a duration of .04H with the period between the leading edges of successive pulses being H. This pulse train is supplied to input terminal 21 of APC oscillator 20. The 31.5 kc. square-wave reference clock signal at terminal 22 is shown with its leading edge delayed .02H with respect to the leading edge of the 15.75 kc. pulse train. This delay is due to the fact that the phase comparison of the output of the oscillator 20 with the 15.75 kc. reference clock is taken at the midpoint of the individual pulses, i.e. .02H after the occurrence of the leading edge.

As mentioned, the pulse train appearing at the output terminal 25 of delay clock generator 24 comprises a series of pulses at a rate equal to the equalizing pulse rate and having a duration of .04H. The leading edges of the pulses are delayed by .04H from the leading edge of the 15.75 kc. reference clock. This duration of .04H is equal to the duration of the equalizing pulses in the standard composite sync signal. The composite sync signal is shown in FIG. 2 during portions of both even and odd fields. It is to be noted from FIG. 1 that the composite sync signal is supplied from input terminal 11 of generator 10 to both the delay circuit 13 and "and" circuit 14. Delay circuit 13 preserves the shape of the width-modulated composite sync signal but delays each pulse by .04H, the duration of the shortest pulse in the composite signal. One type of integratable delay circuit found suitable for use in the present system comprises first and second monostable multivibrators having "on" periods equal to the .04H delay. The leading and trailing edges of the individual pulses in the composite sync signal trigger the first and second multivibrators respectively. A set-reset bistable multivibrator, triggered by the trailing edges of the pulses generated by the first and second multivibrators, produces a delayed composite sync signal at its output. The output of delay circuit 13, shown in FIG. 2, is supplied to "and" circuit 14.

When the composite sync signal, the delayed composite sync signal, and the 31.5 kc. delay clock signal are "anded" together in the "and" circuit 14, the resultant signal appearing at output terminal 15 of generator 10 is the binary composite sync signal. This signal is the binary equivalent of the received composite sync signal and is comprised of a number of pulses of equal duration. The horizontal sync signals appear as "ones" alternating with "zeros" displaced as in the received composite sync by an interval of $H/2$ between the odd and even fields. The equalizing pulses of .04H duration do not provide a coincident condition in the "and" circuit and appear as a series of six consecutive "zeros." The vertical sync signal appears as group of six consecutive "ones" with the first "one" occurring at the 524th line interval for both the odd and even fields.

The digital signal (0, 1, 1) occurs only once during each field at the beginning of the vertical sync signal. Thus, this signal uniquely occurring during each field can be utilized to provide the phase information necessary for the generation of a local vertical sync signal. This three bit (0, 1, 1) signal is referred to hereinafter as the framing code. While it is to be noted that the (1, 1, 0) signal appearing during the third and fourth and fifth horizontal line intervals also uniquely occurs during each field, it is preferable to utilize the leading portion of the vertical sync signal since the vertical sweep signal occurs during this interval.

Output terminal 15 of generator 10 is coupled to input terminal 30 of first shift register 31. Register 31 serially receives the bits of the binary composite sync signal and stores a predetermined number of the bits. The register is required to have a capacity of at least the number of bits contained in the uniquely occurring framing code which, in this case, is the three bits (0, 1, 1). Register 31 is provided with first and second output terminals 32 and 33. First terminal 32 is coupled to input terminal 34 of preset comparator 35 and second output terminal 33 is coupled to first input terminal 36 of gated comparator 37.

Preset comparator 35 is a binary comparator having the framing code preset therein. A binary comparator detects the equivalency of two binary numbers, and in the case of preset comparator 35 compares the preset framing code (0, 1, 1) with the binary number stored in the first shift register 31. An output pulse is provided at output terminal 38 of comparator 35 when the framing code appears in first shift register 31. For reasons which will later be explained, the contents of shift register 31 are continually supplied to the preset comparator 35 wherein a continuous comparison with the preset framing code takes place.

The binary number stored in shift register 31 is applied in a serial manner at input terminal 30. The register continually converts the binary bits to their parallel or space sequence equivalents for comparison in gated binary comparator 37 with a locally generated framing code. The locally generated framing code is stored in second shift register 42. Both shift registers 31 and 42 are coupled via gating terminals 39 and 41 respectively to output terminal 26 of delay clock 24 which supplies shift pulses thereto at the system frequency. Thus, a pulse is supplied during each line interval. The contents of shift register 31 are supplied to input terminal 36 of gated comparator 37. In normal operation, the received (0, 1, 1) framing code is transferred into comparator 37 once each field. Comparator 37 is a binary comparator which upon the application of a gating pulse at its gate terminal 46 provides an error pulse at terminal 44 if the contents of the first and second registers are not equivalent. The gating pulse is applied during the interval following the 525th line interval. The condition of equivalence corresponds to the simultaneous presence of the (0, 1, 1) framing codes in both registers and indicates the condition of phase synchronization between the locally generated vertical sync signal and the received vertical sync information contained in the received composite sync signal.

The local framing code is generated in the following manner. The 31.5 kcs. square-wave signal appearing at the output terminal 22 of oscillator 20 is supplied to input terminal 51 of divider 50. Divider 50 has a total division ratio of 525 to 1 so that the application of the 31.5 kcs. signal to terminal 51 results in a 60 c.p.s. signal at terminal 52. This is the frequency of the vertical sync signal in a standard television receiver. In addition to generating a 60 c.p.s. signal, the divider 50 is coupled via output terminals 52, 53, 54 and 55 to local frame code generator 60.

The local frame code generator operates in synchronism with the divider 50 and the 31.5 kc. pulse train from delay clock output terminal 26 to produce the three bit (0, 1, 1) framing code every locally generated field during its 523rd, 524th and 525th line intervals. As shown, divider 50 is comprised of a plurality of individual dividers 61, 62, 63 and 64 having a total division factor of 525. The use of the individual dividers to provide a total division factor of 525 is in accordance with the manner in which the 60 c.p.s. vertical sync signal is generated at commercial transmitting stations and requires relatively few individual dividers. However, other divider combinations may be employed if desired.

The output signals from each of the individual dividers in the chain are coupled to frame code generator 60 wherein they are combined to identify the interval during which the local frame code is to be generated. This interval corresponds to the 523rd through 525th horizontal line scan of the locally generated signal. This interval of the local signal may or may not be in phase with the corresponding interval of the binary equivalent sync signal at terminal 15 of generator 10. In either case, the local frame code generator 60 produces the individual bits of the unique framing code at its first output terminal 66 during the 523rd, 524th and 525th line intervals of the local signal. Output terminal 66 of generator 60 is coupled to input terminal 47 of second shift register 42 and the local framing code is serially read into shift register 42 wherein it is converted to its space sequence equivalent. Also, the frame code generator 60 provides a gate pulse at its second output terminal 65 in the interval following the generation of the local framing code, i.e. the first line interval of each field. This gate pulse is supplied to gate input terminal 46 of comparator 37 and to input terminal 71 of digital error detector 70. As mentioned previously, the condition of phase synchronization between the locally generated 60 c.p.s. vertical sync signal at divider terminal 52 and the vertical sync signal of the composite sync signal corresponds to the simultaneous receipt of the (0, 1, 1) framing codes in comparator 37 from the shift registers. If one of binary numbers stored in the shift registers is not (0, 1, 1), an error pulse is produced at output terminal 44 of comparator 37.

Thus, the error pulse at output terminal 44 of comparator 37 indicates that a phase difference exists between the local and the received vertical sync signals. Neglecting for the moment digital error detector 70, the output terminal 44 is coupled to the set terminal of inhibit flip-flop 75. When set, the voltage level at the output terminal of flip-flop 75 changes. This output terminal is coupled to inhibit terminal 67 of frame code generator 60 and inhibit terminal 57 of divider 50. The voltage level corresponding to the set condition of flip-flop 75 inhibits both the divider 50 and the local frame code generator 60. As a result, no vertical sync signals appear at divider output terminal 52 until inhibit flip-flop 75 is reset. In addition, no signals are supplied to frame code generator 60 from divider terminals 52 through 55.

Since the divider is inhibited when an out-of-phase condition is detected, no vertical sync pulses are supplied to the receiver circuits. However, the present system is capable of correcting for the lack of phase synchronization and providing vertical sync pulses with the proper phase within the 16.67 μsec. field interval. As mentioned previously, the binary composite sync signal is continuously applied to input terminal 30 of first shift register 31 which stores at least the number of digits contained in the framing code. Also, the contents of shift register 31 are continuously supplied to input terminal 34 of preset comparator 35 which continuously compares the supplied signal with the framing code (0, 1, 1) preset therein. An output pulse is generated by comparator 35 whenever the framing code of the binary composite signal is recognized. The output terminal 38 of comparator 35, in addition to the output terminal 22 of 31.5 kcs. oscillator 20, is coupled to "and" circuit 80. The output of the "and" circuit is coupled to the reset terminal of inhibit flip-flop 75.

The preset comparator 35 generates an output pulse each field at the time of the receipt of the framing code of the binary composite signal. As a result, a pulse is applied to the reset terminal of flip-flop 75 once each field. If no phase error has been previously recognized by comparator 37, the inhibit flip-flop is in the reset state and the output of comparator 35 has no effect. However, the recognition of a lack of phase synchronization between the binary composite signal and the locally generated signal results in the "setting" of flip-flop 75 and the inhibiting of the local vertical signal. Thus, the inhibiting voltage level at the output terminal of flip-flop 75 is changed at the time when the comparator 35 recognizes the (0, 1, 1) framing code of the binary composite signal and generates the pulse which resets flip-flop 75.

The "resetting" of flip-flop 75 results in the initiation of the operation of divider 50. Consequently, divider 50 starts counting and dividing at the time of the 1st line interval of the binary composite sync interval and phase synchronization is obtained. In addition, resetting flip-flop 75 enables local frame code generator 60 to resume operation so that it will generate the (0, 1, 1) code during the 523rd, 524th and 525th line intervals of the local signal. Thus, in normal operation the shift registers simultaneously contain the (0, 1, 1) code during each succeeding field. The gated comparator 37 produces no error signal until the binary composite and the local sync signals again fall out of phase.

Digital error detector 70 is coupled between output terminal 44 of comparator 37 and the set terminal of flip-flop 75 to distinguish false error indications from a true out of phase condition. The detector 70, shown in FIG. 1, functions as the digital equivalent of an analogue integrator and provides an output pulse at its output terminal 73 only after receiving a predetermined number of error pulses in a specified period of time at input terminal 72. The binary counter 81 is reversible with the count therein being increased when an error pulse is applied to terminal 72 and reduced by one count each field when synchronization is obtained and no error pulse is applied. Counting stops when either the counter is full or empty and memory flip-flop 82 is triggered into its corresponding state. When the counter is full, flip-flop 82 is set and an error pulse is coupled through "and" circuit 83 to output terminal 73. Terminal 73 is coupled to the set terminal of inhibit flip-flop 75.

The memory flip-flop is triggered only when the counter reaches its "full" or "emtpy" states. Thus, the inhibit flip-flop 75 is only set after a number of error pulses are provided at the input terminal 72 in the specified time interval. In the embodiment shown, counter 81 was selected to have a capacity of 4. Therefore, the system was immune to three consecutive false out-of-phase signals. However, it will be noted that increased immunity to false error signals is obtained at the expense of system sensitivity since a plurality of consecutive error signals are necessary to set flip-flop 75.

When the flip-flop 75 is set and divider 50 is inhibited, the memory flip-flop 82 remains in its set condition until counter 81 is emptied. However, the setting of inhibit flip-flop 75 by the error signal from the error detector is overridden by the reset pulse from preset comparator 35 during the following received framing code interval and the operation of the divider 50 commences. When synchronization is obtained and no error pulse is generated at output terminal 44 of comparator 37, no signal is supplied to "and" circuit 83 and, therefore, inhibit flip-flop 75 remains in its reset state. The integratable digital error detector 70 is described in further detail in my copending U.S. patent application Ser. No. 660,296, filed Aug. 14, 1967 and assigned to the same assignee as is the instant application. It shall be recognized that other types of error detectors may be used if desired.

While the foregoing description is primarily concerned with the generation of the 60 c.p.s. vertical sync signal, the system shown in FIG. 1 can also be utilized to generate the 15.75 kcs. horizontal sync signal. Since the 31.5 kcs. oscillator 20 is automatically phase controlled to the received composite sync signal, a 15.75 kcs. signal is readily provided by coupling oscillator output terminal 22 to first input terminal 91 of divider 90. Divider 90 has a division factor of 2 and introduces phase uncertainty into the generation of the 15.75 kcs. signal. This phase uncertainty is compensated for in the present system by coupling output terminal 92 of divider 90 to first input terminal 95 of phase correction circuit 94. The second input terminal 96 is coupled to a second output terminal 19 of 15.75 kcs. reference clock generator 16. In addition to generating a 15.75 kcs. pulse train at its first output terminal 18, generator 16 provides a 15.75 kcs. reference phase signal at its second output terminal 19. The reference phase signal is similar to the 15.75 kcs. pulse train in that it is comprised of a number of pulses having a width of .04H except the leading edges of those pulses are delayed by 0.25H with respect to the pulses at terminal 18.

The reference phase is applied to terminal 96 of the phase correction circuit 94. Correction circuit 94 compares the timing of the reference phase signal and the output of the divider and provides an output signal when coincidence exists. The signal at second input terminal 93 causes a correction signal to appear in the output of divider 90. The correction signal reverses the phase of the 15.75 kcs. horizontal sync signal. Since the out of phase condition of the horizontal sync signal is a phase reversal due to the division by a factor of 2 of the 31.5 clock signal, the insertion of the correction pulse, in effect, delays the occurrence of the leading edge of the horizontal sync signal by $H/2$ and provides the corrective phase reversal.

Since the reference phase signal is not immune to spurious noise pulses occurring randomly within the reference pulse train, an error detector is included in the phase correction circuit to provide a measure of noise immunity. The error detector is comprised of integrator 84, Schmitt trigger circuit 85 and "and" circuit 86. This type of error detector is generally referred to as an "integrate and trigger" error detecting circuit and ignores one or more error signals in a specified time interval before deciding that phase correction is required. Since the integrator 84 of this type of error detector utilizes a relatively large capacitor, it may require the use of discrete components. Accordingly, a digital error detector of the type employed in the vertical sync circuit may be utilized when the system is to be fabricated in integrated circuit form.

The timing diagram of FIG. 3 shows the signal waveforms occurring at different points in the embodiment of FIG. 1. It shall be noted that individual waveforms are referenced to the block diagram of FIG. 1 by corresponding letter symbols. The timing diagram includes both odd and even field scan intervals and illustrates both vertical and horizontal phase corrections. The composite sync signal is shown as it is applied at terminal 11 of the binary sync signal generator 10. The signal includes horizontal sync pulses having a width of .08H and occurring at a rate of 15.75 kcs. and, in addition, equalizing pulses having a width of .04H and occurring at a rate of 31.5 kcs. prior to and after the 60 c.p.s. vertical sync pulses. The odd and even fields which comprise a complete frame begin, as shown, at a serration in the vertical sync signal.

The binary composite sync signal appearing at output terminal 15 consists of a series of "ones" and "zeros" occurring at a bit rate of 31.5 kcs. The equalizing pulses consist of groups of six consecutive "zeros" occurring before and after the vertical sync signal. The vertical sync signal is shown consisting of six consecutive "ones" beginning during the 524th line interval and terminating at the 4th line interval. The (0, 1, 1) framing code occurs each field during the 523rd, 524th and 525th line intervals and is shown bracketed in FIG. 3. As mentioned previously, this unique framing code is utilized for the phase synchronization of the binary composite signal with the locally generated vertical sync signal.

Directly below the binary composite signal in FIG. 3, the 31.5 kcs, clock signal from oscillator 20 is shown. In addition, the 15.75 kcs. locally generated horizontal sync signal appearing at output terminal 92 of divider 90 and the corresponding horizontal sawtooth sweep signal are shown. It shall be noted that the locally generated vertical frame code (0, 1, 1) produced by frame code generator 60 and stored in shift register 42 is shown in FIG. 3 initially out-of-phase by an interval of 2½H with respect to the framing code of the binary composite signal.

The waveforms of the signals occurring at the divider output terminals 53, 54, 55 and 52 are shown in that order in FIG. 3. The signals at each terminal are all at their high voltage level during the line interval following the locally generated framing code, i.e. the 1st line interval. While the 60 c.p.s. vertical sync signal at terminal 52 initiates the vertical sweep retrace signal in the receiver during the first line interval, it has done so in the case shown by an interval of 2½H earlier than desired.

Therefore, the framing codes are not in synchronization and the gated binary comparator 37 produces an error pulse at its output terminal 44 which is supplied to digital error detector 70. Assuming that at this time the detector lacks two additional error signals in order to be "full," this error pulse advances the count in the detector but does not cause the memory flip-flop 82 to be triggered. Accordingly, no error signal appears at the output terminal 73 of the error detector and the inhibit flip-flop 75 is not set. As mentioned previously, the preset comparator 35 provides a reset pulse for the inhibit flip-flop once each field at the termination of the received framing code. This is the last waveform shown in FIG. 3.

At the start of the first complete odd field interval in FIG. 3, the locally generated vertical frame code is out of phase with the framing code of the binary composite sync signal by the interval 2½H. Since the embodiment of FIG. 1 contains a digital error detector for noise immunity and the detector has not received the required number of error pulses in a specified time interval, no corrective action is provided during this field. At the completion of this field, the local framing code is generated prior to the occurrence of the received framing code and the gated comparator 37 provides an error pulse at its output terminal 44. This error pulse is supplied to the detector 70 and fills counter 81 which results in the setting of memory flip-flop 82. The set voltage level of the memory flip-flop and the corresponding error pulse are shown in FIG. 3. The error pulse sets inhibit flip-flop 75 which inhibits the operation of the individual dividers of divider 50. As shown, the horizontal sync signal continues to be generated during the 2½H interval at the end of the odd field in which the dividers are inhibited.

At the time of the occurrence of the (0, 1, 1) framing code of the binary composite sync signal, the preset comparator 35 provides a reset pulse which is gated in "and" circuit 80 and supplied to inhibit flip-flop 75. When the inhibit flip-flop is reset, the operation of the dividers is initiated and the locally generated vertical sync signal is rephased with respect to the received signal. The resetting of the inhibit flip-flop also initiates the operation of the local frame code generator 60 so that the local (0, 1, 1) framing code is generated during the following 523rd, 524th and 525th line intervals.

The corrective action which provides the phase synchronization of the locally generated vertical sync signal takes place during the field in which it is recognized. The number of fields required for the out-of-phase condition to be recognized depends primarily on the number of error pulses required to trigger the memory flip-flop of the digital detector. In the embodiment described, the capacity of the reversible counter of the error detector was four so that correction can occur within four fields or less than 100 msec. Since the detector is employed to provide noise immunity, the number of error pulses required to trigger it in a given time interval may be varied in accordance with the operating environment.

The phase synchronization of the vertical sync and sweep signals, shown at the beginning of the even field in FIG. 3, takes place at a time when the horizontal sync signal is out of phase with the binary composite sync signal. (The horizontal sync signal is in phase with the binary composite sync signal when its leading edges correspond to the occurrence of pulses in the binary composite sync signal.)

The out of phase condition is seen in FIG. 3 to continue until correction takes place by the insertion of a correction pulse in the locally generated 15.75 kcs. horizontal sync signal. The time of the occurrence of the phase correction is determined by the sensitivity of the phase correction circuit 94. As mentioned, correction circuit 94 contains an error detector which provides noise immunity by responding only to a number of errors in the specified time interval. This time for response can be varied for a particular application, and in the embodiment shown the response takes place within an interval of approximately two fields (2 v.).

The insertion of the correction pulse in the square-wave horizontal sync signal provides the necessary phase correction since it results in the premature termination of the coresponding horizontal sweep. The retrace of this sweep is initiated one line interval prior to the interval in which it normally occurs. For example during the last field in FIG. 3, the horizontal correction results in the termination of the sweep at an even interval rather than an odd interval of the binary composite sync signal. Consequently, the retrace of the succeeding sweep signals in this field occurs during the even line intervals of the received composite sync signal.

In summary, the system of FIG. 1 translates the received composite sync signal into a binary equivalent sync signal which retains all of the frequency and phase information present in the composite signal. A unique reference or framing code in the binary signal is utilized to extract the vertical timing information and is compared with a locally generated framing code to insure synchronism between the received signal and a locally generated 60 c.p.s. vertical sync signal. The correction to obtain vertical synchronization can be provided within the following 16.67 msec. field interval. The local clock signal which consists of a square-wave signal at a frequency of 31.5 kcs. is automatically phase controlled with respect to the received composite sync signal. This clock signal is divided to provide the 15.75 kcs. horizontal sync signal which is phase compared with a delayed reference phase signal derived from the received composite signal to insure synchronization with the vertical sync signal.

Figure 4:
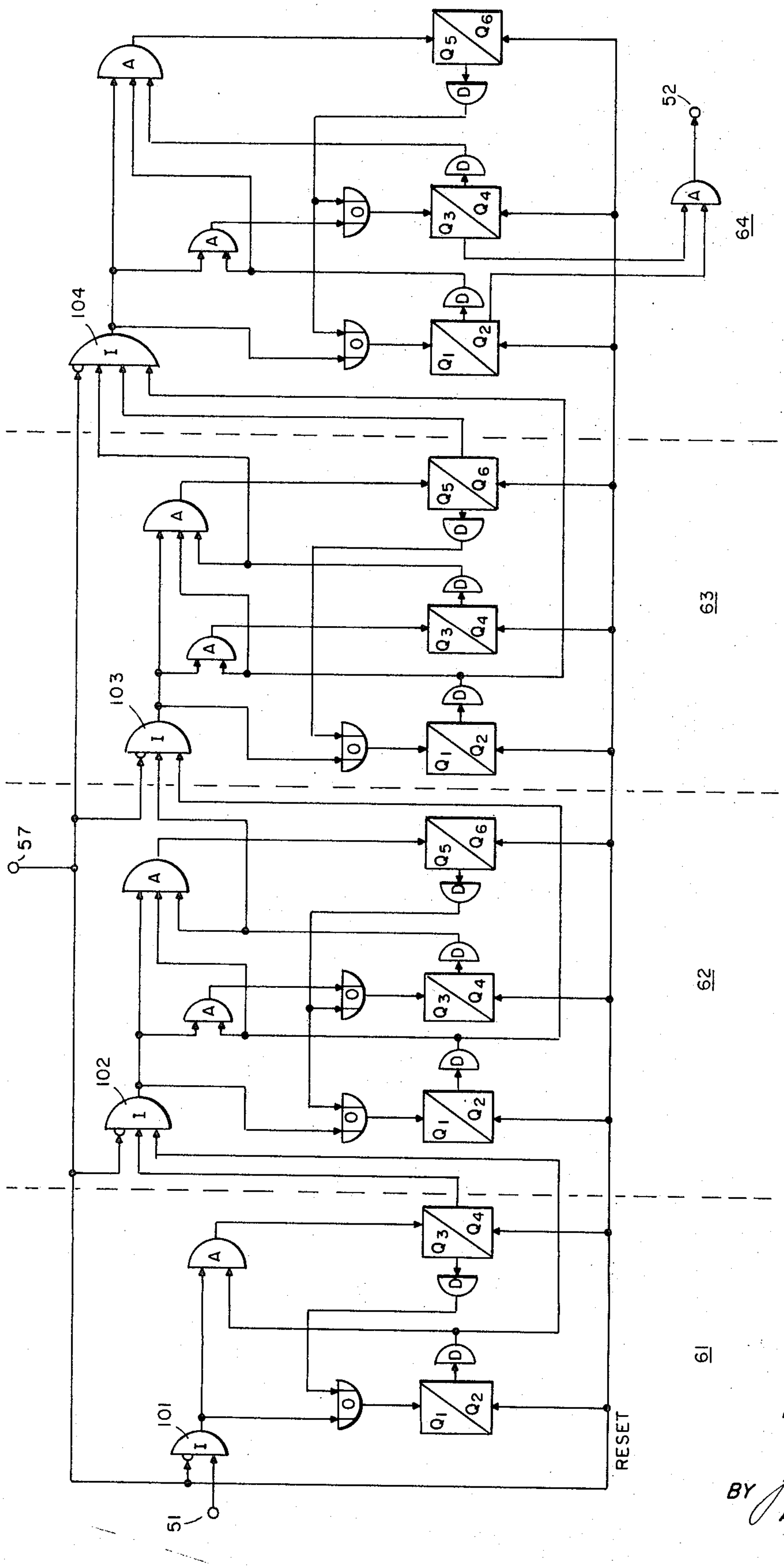
FIG. 4 is a block diagram of the divider chain 50 of the embodiment of FIG. 1.

The local 60 c.p.s. vertical sync signal is generated by divider 50 which has a total division ratio of 525. This divider is comprised of a chain of binary dividers 61 through 64 and is shown in greater detail in FIG. 4. The cascaded series of dividers divides the 31.5 kcs. square-wave reference clock signal of oscillator 22 by factors of 3, 5, 7, and 5, respectively, and provides the intermediate sub-frequency signals at 10.5 kcs., 2.1 kcs., and 300 c.p.s. utilized to generate the local vertical framing code. While many types of dividers can be employed, the modified form of parallel or synchronous binary counter shown in FIG. 4 is preferred since timing problems resulting from the accumulative delay characteristic of long cascaded serial divider chains are essentially eliminated. In a serial chain, the propagation time of a signal from the input to output terminals is approximately equal to the sum of the switching times of every serial binary. The parallel or synchronous type of counter reduces the effective delay to the switching time of a single binary element. Therefore, in the counter of FIG. 4, the total delay is essentially equal to the additive delay of the four individual dividers 61, 62, 63 and 64 or four times the switching time of a single element.

Each of the individual dividers incorporates separate inhibit and reset control to permit stopping (inhibit) and synchronous starting of the entire chain. Terminal 57 is connected, as shown in FIG. 1, to inhibit flip-flop 75. When flip-flop 75 is set, the voltage level at terminal 57 increases and simultaneously inhibits the application of additional input pulses to each of the individual dividers.

It is to be noted from FIG. 4 that the input of each divider is provided through a corresponding inhibit circuit 101, 102, 103 and 104 with the inhibit terminal of each circuit being coupled to divider terminal 57. In addition, the divider terminal 57 is coupled to each of the binary stages in the individual dividers so that the set voltage level at terminal 57 not only inhibits the dividers but also resets them to their initial states so that they can be started in synchronism.

The timing diagram for the divide-by-three divider 61 is shown in FIG. 5*a* and is referred to during the description of the block diagram of divider 61. As shown in the block diagram of FIG. 4, the clock and inhibit signals are supplied to inhibit circuit 101. In addition, the inhibit signal resets the individual binary elements in the "zero" or empty state. At the termination of the inhibit signal, all binary elements are in the "zero" state and the clock pulses are passed by inhibit circuit 101. As shown in the timing diagram of FIG. 5*a*, the first clock pulse changes the state of binary element $Q_1$–$Q_2$. During the second clock interval, the input clock pulse changes the states of elements $Q_1$–$Q_2$ and $Q_3$–$Q_4$. However, the change of state of element $Q_3$–$Q_4$ is fed back to element $Q_1$–$Q_2$ through a delay element D so that the state of element $Q_1$–$Q_2$ is again changed. This operation is shown during interval 2 in FIG. 5*a* wherein element $Q_1$–$Q_2$ quickly reverts to its previous state. The following clock pulse (interval 3) reverses the states of both elements to obtain the original state (interval 0) of the divider and provide the required divide-by-three count. For the present embodiment, the divider output is taken by "anding" the outputs of $Q_2$ and $Q_3$ during interval 1 as shown in FIG. 5*b*.

The delay elements D are logically necessary to sense the condition of the old or previous count in the "and" circuits for at least the duration of the input pulse rather than immediately sensing the new count into which the binary elements are switched. Normally, the transition time of the binary element is sufficient to provide the delay. However if discrete delay networks are desired, delay elements such as monostable multivibrators having a delay of approximately 1 $\mu$sec. may be utilized in the feedback paths. While the afore-described divider has relied on the sensing of the "old" count for its logic sequence, the logic sequence may be based on the "new" count by taking the outputs from the opposite halves of the binary elements. For example in divider 61, taking the output from element $Q_1$–$Q_2$ at $Q_1$ rather than $Q_2$ results in the clock pulse during interval 1 reversing the state of $Q_1$ from a "one" to a "zero" and preventing the phase reversal of binary $Q_3$–$Q_4$.

The timing diagrams for the divide-by-five counter 62 and the divide-by-seven counter 63 are shown in FIGS. 6*a* and 7*a* respectively. The input pulses to these dividers are derived from the preceding divider. The input pulse interval 1 and the output connections for the dividers 62 and 63 are shown in FIGS. 6*b* and 7*b* respectively. The timing diagram and output connections for divide-by-five divider 64 (not shown) is essentially the same as that shown in FIGS. 6*a* and 6*b*. The output of the entire divider chain 50 corresponds to the "one" states of $Q_2$ and $Q_3$ of elements $Q_1$–$Q_2$ and $Q_3$–$Q_4$ of divider 64 as noted in the timing diagram of FIG. 6*b* for a divide-by-five counter.

The local frame code generator 60 operates in synchronism with the divider chain 50 and the 31.5 kcs. delay clock signal to produce the three bit (0, 1, 1) local framing code every field during the 523rd, 524th and 525th line intervals. Thus, the frame code generator is required to identify these intervals and generate the 0, 1, and 1 output signals in the appropriate line intervals. This interval recognition and code generation is accomplished by coupling selected binary elements to the generator. Since the binary counters utilized in the divider 50 receives 525 pulses in consecutive intervals, each interval can be identified by sampling the states of particular binary elements in the divider. In other words, the counter contains 525 different combinations of the states of its individual elements. It is apparent that the particular connections utilized to recognize the intervals during which the framing code is generated is determined by the type of dividers employed and the division factors thereof. The connections for the present embodiment are shown in the block diagram of generator 60 in FIG. 8 wherein the individual input terminals are labeled according to the frequency of the input signal and the particular binary element of the corresponding divider.

The frame code generator includes "and" circuit 110 having its two input terminals coupled to binary elements $Q_2$ and $Q_3$ of divide-by-three counter 61. The output of "and" circuit 110 is coupled to an inhibiting terminal of inhibit circuit 111. Thus when elements $Q_2$ and $Q_3$ of divider 61 are in the "one" state, the voltage level at the output of inhibit circuit 111 is at the "0" voltage level. In addition, binary elements $Q_1$ and $Q_3$ of dividers 62, 63 and 64 are coupled to inhibit circuit 111. These binary elements are utilized to identify the 523rd, 524th and 525th intervals. To time the framing code, one input terminal of inhibit circuit 111 is coupled to delay clock 24.

Since the operation of the framing code generator 60 is to be inhibited in synchronism with the inhibiting of the divider chain 50, the "set" output terminal of inhibit flip-flop 75 is coupled to terminal 67 of the frame code generator. The terminal 67 is coupled to inhibit circuit 111 so that the application of the inhibit signal to terminal 67 results in a "0" voltage level appearing at generator output terminal 66.

The timing diagram of FIG. 9 shows the various input signals to the frame code generator and, in particular the states of the different binary elements, during the 523rd, 524th and 525th intervals. The "one" state of the elements corresponds to the baseline voltage in the waveforms of FIG. 9. It shall be noted that during the 523rd interval both elements $Q_2$ and $Q_3$ of divider 61 are in the "one" state. Consequently, a "0" voltage level appears at output terminal 66 during this interval. During the 524th and 525th line intervals, first $Q_3$ and then $Q_2$ of divider 61 are in the "zero" state so that coincidence with the "one" states of the other binary elements is obtained and the 0, 1, 1 framing code is generated during the appropriate intervals. In addition to the framing code, the generator 60 provides a gate pulse during the first interval of the next field. As shown in FIG. 1, this gate pulse is applied at terminal 46 of gated comparator 37 and at terminal 71 of detector 70.

The gate pulse at terminal 65 is provided by applying the frame code and the state of binary element $Q_3$ of divider 61 to "and" circuit 112. The "and" circuit provides an output pulse during the 525th interval when $Q_3$ is in the "one" state. The output pulse is delayed for one interval in delay circuit 114 so that it occurs during the first interval. In practice, a monostable multivibrator in combination with the output of delay clock 24 may be utilized as the delay circuit.

As mentioned, the local framing code at terminal 66 is serially applied at terminal 47 of shift register 42. Also, the received framing code is stored in shift register 31. The contents of both registers are compared in gated comparator 37. The gated comparator is shown in the block diagram of FIG. 10.

The comparator 37 produces an output or error signal when the local framing code and the received framing code of the binary composite signal are not stored in time coincidence in the shift registers. The error signal is produced at terminal 44 during the first interval. In the diagram of FIG. 10, the local framing code $B_1$, $B_2$, $B_3$ of register 41 is "anded" for coincidence bit-by-bit with the received framing code $A_1$, $A_2$, $A_3$ of register 31. Since bits $A_1$ and $B_1$ are "zeros," inverters 127 and 128 are coupled to the input terminals of "and" circuit 120.

Bits $A_2$ and $B_2$ and bits $A_3$ and $B_3$ are "anded" in circuits 121 and 122 respectively. The circuit outputs are coupled to "and" circuit 123 which provides an output signal when both (0, 1, 1) framing codes are in synchronism. This signal triggers a single-shot multivibrator 124 which is "anded" with the gating pulse from the frame code generator in circuit 125. The coincidence of the output signal from "and" circuit 123 and the gating pulse produce an output pulse which is inverted by amplifier 126 so that no error signal appears at output terminal 44. In the situation wherein the framing codes are out of synchronism, the multivibrator 124 is not triggered so that coincidence is not obtained at "and" circuit 125 and an error pulse appears at terminal 44.

The preset binary comparator 35, shown in FIG. 1, continuously examines the binary equivalent signals stored in shift register 31 and produces an output pulse whenever the framing code is recognized. This output pulse terminates the inhibit condition of the divider chain 50. This comparator is similar to comparator 37 except that the negating circuitry comprising "and" circuit 125 and inverting amplifier 126 are not employed.

The timing for the 31.5 kcs. oscillator 22 and the horizontal sync signal is provided by 15.75 kcs. reference clock generator. As mentioned previously, the generator provides a 15.75 kcs. pulse train at terminal 18 which contains pulses having a width of .04H. This is the width of the equalizing pulses of the conventional composite sync signal. In addition, the generator provides a 15.75 kcs. reference phase signal at its output terminal 19 which consists of pulses of .04H duration having their leading edges delayed by 0.25H with respect to the pulse train at terminal 18. A block diagram of the generator utilized in the present embodiment is shown in FIG. 11.

The leading edge of the composite sync signal triggers a pair of single-shot multivibrators 130 and 131. Multivibrator 130 has an "on" time of .04H so that the pulse it supplies to "and" circuit 134 has the desired duration. However, the output of multivibrator 130 contains the 31.5 kcs. composite frequency component due to the equalizing pulses and the serrations in the vertical sync pulses. This component is eliminated by multivibrators 131 and 132 which have "on" times of 0.75H and 0.5H respectively. Since multivibrator 131 is already "on" when the pulse rate is increased during the equalizing interval, the pulses occur at the 15.75 kcs. rate. Multivibrator 132 is triggered by the trailing edge of the output of multivibrator 131 and has an "on" time of 0.5H. The output signal is supplied to "and" circuit 134 which provides the 15.75 reference clock signal utilized for APC operation of the oscillator 22. In addition, the output of multivibrator 132 is supplied to multivibrator 133 which has an "on" period of .04H. The output of multivibrator 133 is the reference phase signal and contains pulses of 0.4H width which are delayed by 0.25H with respect to the reference clock.

The present system has been successfully employed in discrete component form to provide a digital synchronization of a television receiver utilizing the conventional composite sync signal. While the foregoing description of the system has referred to a specific embodiment of the invention, it is recognized that many variations and modifications may be made therein without departing from the spirit and scope of the invention.

What is claimed is:

1. A digital synchronizing system for a television receiver which comprises:

(a) a binary sync signal generator for receiving a composite sync signal and generating a binary equivalent thereof;

(b) a first register coupled to the output of said generator, said register receiving the binary equivalent signal and storing a number of bits thereof;

(c) means for generating a local sync signal, said means generating a local framing code in accordance with said local sync signal;

(d) a second register coupled to said means for generating a local signal, said second register receiving the local signal and storing a number of bits thereof;

(e) a first comparator coupled to said first and second registers, said comparator comparing the contents of said first and second registers at a predetermined time and providing an error signal when the contents of said registers are inequivalent, said first comparator being coupled to said means for generating a local sync signal, said error signal inhibiting the generation of the local sync signal, and (f) initiating means coupled to said first register and to said means for generating a local sync signal, said initiating means overriding the inhibiting of said local generating means at a prescribed time whereby synchronization of the received composite sync signal and the local sync signal is effected.

2. The system of claim 1 wherein said initiating means comprises a second comparator coupled to said first register and containing a number preset therein, said comparator comparing the contents of said first register with the preset number and overriding the inhibiting of said local generating means when the contents of said first register is equivalent to said preset number.

3. The system of claim 1 wherein said binary sync signal generator comprises:

(a) a coincidence gate having the composite sync signal supplied thereto;

(b) delay means for receiving said composite sync signal and providing a delay thereof, the output of said delay means being supplied to said gate, and (c) means for applying a clock signal to said gate, the signal appearing at the output of said gate being the binary equivalent of said composite sync signal, said signal being supplied to said first register.

4. The system of claim 3 wherein said composite sync signal includes horizontal, vertical and equalizing pulses and said delay means provides a delay of the composite sync signal equal to the duration of said equalizing pulses.

5. The system of claim 1 wherein said means for generating a local sync signal comprises (a) an oscillator providing an output signal at a particular frequency;

(b) divider means coupled to the output of said oscillator, the output signal of said divider being the locally generated sync signal, the operation of said divider being inhibited by the error signal from said first comparator and initiated by a signal from said initiating means, and (c) a local frame code generator coupled to said divider means, said generator providing a local frame code in accordance with the locally generated sync signal, the output of said generator being coupled to said second register.

6. The system of claim 5 further comprising an error detector coupled to the output of said first comparator, said detector providing an output signal upon the receipt of a number of error signals from said comparator in a particular time interval, said output signal inhibiting the generation of the local sync signal, said detector rendering the system relatively immune to false error signals.

7. The system of claim 5 wherein said divider means comprises a chain of synchronous dividers, the output of each of said dividers being coupled to the local frame code generator whereby said generator provides a local framing code during a particular interval of the locally generated signal.

8. In a digital synchronizing system for a television receiver, a binary sync signal generator for receiving a composite sync signal containing horizontal, vertical and equalizing signals and generating a binary equivalent thereof, comprising:

(a) a coincidence gate having the composite sync signal applied thereto;

(b) delay means for receiving the composite sync signal and providing a delay thereof equal to the duration of the equalizing pulses of said composite signal, the output of said delay means being supplied to said gate, and (c) means for applying a clock signal to said gate, the signal appearing at the output of said gate being the binary equivalent of said composite sync signal.

9. The binary sync signal generator in accordance with claim 8 wherein said means for applying a clock signal to said gate applies a pulse train having a pulse rate equal to the pulse rate of the equalizing signals, said pulse train containing pulses having a duration equal to the duration of said equalizing signals.

10. A digital synchronizing system for a television receiver wherein a locally generated vertical sync signal is maintained in phase with a received composite sync signal containing horizontal, vertical and equalizing signals, which comprises:

(a) a binary sync signal generator for receiving the composite sync signal and generating a binary equivalent signal thereof at its output terminal, said binary signal being characterized by the occurrence of a framing code therein during each field;

(b) a first register having an input terminal and first and second output terminals, said input terminal being coupled to the output terminal of said generator, said register receiving the binary equivalent signal and storing a predetermined number of bits thereof, said number being at least as large as the number of bits in said framing code;

(c) local generator means having a plurality of output terminals and an inhibit terminal, said means generating a local signal of the vertical sync signal frequency at one of the output terminals, said means being inhibited by the application of an error signal to its inhibit terminal, (d) a local frame code generator coupled to the output terminals of said generator means, said frame code generator having first and second output terminals, said generator providing a local framing code during each field at the first output terminal and a gating signal during each field at the second output terminal;

(e) a second register having an input terminal coupled to the first output terminal of the local frame code generator and an output terminal, said register receiving the local frame code;

(f) a gated comparator having first and second input terminals, a gating terminal and an output terminal, said first input terminal being coupled to the second output terminal of said first register, said second input terminal being coupled to the output terminal of said second register, said gating terminal being coupled to the second output terminal of the local frame code generator, said comparator comparing the contents of said first and second registers and providing an error signal at its output terminal upon receiving a gating signal when the contents of said registers are inequivalent;

(g) a preset comparator having an input and an output terminal, said input terminal being coupled to the first output terminal of said first register, said comparator providing an overriding signal each field at its output terminal when the framing code is contained in the first register, and (h) means for coupling the output terminals of said gated comparator and said preset comparator to the inhibit terminal of said local generator means whereby said error signal inhibits and said overriding signal initiates the generation of the local vertical sync signal whereby said local signal is maintained in phase with the received composite sync signal.

11. The synchronizing system of claim 10 wherein said means for coupling the output terminals of said gated and preset comparators to the inhibit terminal of said local generator means comprises (a) an inhibit flip-flop having first and second input terminals and an output terminal, said output terminal being coupled to the inhibit terminal of said generator means, said second input terminal being coupled to the output terminal of said preset comparator, and (b) an error detector having an input terminal and an output terminal, said input terminal being coupled to the output terminal of said gated comparator, said output terminal being coupled to the first input terminal of the inhibit flip-flop, said detector providing an output signal upon the receipt of a number of error signals from the gated comparator in a particular time interval thereby rendering the system relatively immune to false error signals.

12. The synchronizing system of claim 10 wherein said binary sync signal generator comprises:

(a) a coincidence gate having an output terminal coupled to the input terminal of said first register, said gate having the composite sync signal applied thereto;

(b) delay means for receiving the composite sync signal and providing a delay thereof equal to the duration of the equalizing pulses of said composite signal, the output of said delay means being supplied to said gate, and (c) means for applying a clock signal to said gate, the signal appearing at the output terminal of said gate being the binary equivalent of said composite sync signal.

13. The synchronizing system of claim 10 wherein said local generator means comprises (a) an oscillator having an output terminal, said oscillator providing an output signal at a particular frequency, and (b) a divider chain having an input terminal, an inhibit terminal, and a plurality of output terminals, said input terminal being coupled to the output terminal of said oscillator, said divider chain providing a local signal at the vertical sync signal frequency at one of said output terminals, said output terminals being coupled to the local frame code generator, said inhibit terminal being coupled to the output terminals of the gated and preset comparators.

14. The synchronizing system of claim 13 further comprising (a) a divider haivng first and seocnd input terminals and an output terminal, said first input terminal being coupled to the output terminal of said oscillator, said divider providing a local signal at the horizontal sync signal freqeuncy at its output terminal, and (b) phase correction means coupled to the output terminal and the second input terminal and the second input terminal of said divider, said means comparing the phase of the local signal at the output terminal of the divider with the phase of the received composite signal and supplying a correction signal to the second input signal of the divider.

15. The method of generating a local vertical sync signal for a television receiver from the received composite sync signal which comprises the following steps:

(a) receiving the composite sync signal and generating a binary composite sync signal, said binary signal containing a binary framing code each field;

(b) generating a local signal at the vertical sync signal frequency;

(c) generating a local binary framing code each field at prescribed time relative to the local signal;

(d) comparing the times of occurrence of the framing code of the binary composite signal and the local framing code;

(e) inhibiting the generation of the local signal if the framing codes do not occur simultaneously; and (f) initiating the generation of the local signal at the occurrence of the next framing code in the binary composite sync signal.

16. The method in accordance with claim 15 wherein the step of receiving the composite sync signal and generating a binary composite sync signal comprises the following steps (a) receiving the composite sync signal;

(b) delaying a portion of the composite sync signal by a prescribed amount;

(c) generating a delay clock signal, the delay of said clock being equal to the delay of said portion of the composite signal; and (d) combining the delay clock signal, the delayed portion of the composite sync signal and the received composite sync signal to provide a first binary ignal when all of the combined signals are in time coincidence and a second binary signal when all of the combined signals are not in time coincidence.

References Cited

UNITED STATES PATENTS

| | | | |
|---|---|---|---|
| 2,655,556 | 10/1953 | Abelson | 178—69.5 |
| 2,802,046 | 8/1957 | Keen | 178—7.8 |
| 3,047,658 | 7/1962 | March | 178—69.5 |

ROBERT L. GRIFFIN, Primary Examiner

R. L. RICHARDSON, Assistant Examiner

U.S. Cl. X.R.

178—69.5